Patented June 21, 1938

2,121,194

UNITED STATES PATENT OFFICE 2,121,194

WELDING ROD

Charles Hardy, Pelham, N. Y., assignor to The Linde Air Products Company, a corporation of Ohio No Drawing. Application October 18, 1932, Serial No. 638,334

8 Claims. (Cl. 219—8)

The invention relates to welding rods, and provides a new and useful rod for depositing metals, alloys or compounds by thermal fusion with a welding flame, electric arc or equivalent source of heat at welding temperature.

The welding rod of the invention comprises a coherent aggregate of finely divided or comminuted materials. Preferably at least a part of said materials is a metal in the form of irregular or dendritic particles such as may be produced by electrolytic deposition of the metal, but materials comminuted by any method may suitably be used. The aggregate may be rendered coherent by the application of pressure, followed when desirable or necessary by a suitable heat treatment.

By using powdered materials it is possible to produce welding rods having compositions and properties not readily obtainable by the usual methods of making welding rods. For example, many compositions segregate or fume badly in the melting pot, or cannot be machined, forged or rolled and are therefore unsuited for fabrication into welding rods by ordinary methods. In accordance with my invention welding rods can be produced from many of these compositions. Further, finely-divided pure metals and alloys may be used to produce a rod free from impurities such as are picked up in the melting pot. It is also possible to incorporate in the body of the rod a suitable flux.

To illustrate the application of the invention, the following examples are given:

Example 1.—38 grams of electrolytically formed finely divided copper, 53 grams of finely divided phosphor-copper containing about 15% of phosphorus, 8 grams of powdered tin, and 1 gram of anyhydrous borax were thoroughly mixed, pressed into the shape of a rod under a pressure of about 35,000 pounds per square inch, and sintered in an atmosphere of hydrogen at a temperature of about 235° C. The resultant rod was strong enough to stand moderately rough handling.

Example 2.—A mixture identical with that used in Example 1 was pressed into a rod under a pressure of about 100,000 pounds per square inch. The rod was sound and strong enough to stand shipping without further treatment. Sintering at 700° C. in hydrogen further increased the strength of the rod.

Example 3.—A mixture consisting of 35 grams of comminuted nickel, 15 grams of finely divided zinc, 48.6 grams of electrolytically formed comminuted copper, 1.7 grams of a powdered copper-silicon alloy containing about 15% of silicon, and 1 gram of anhydrous borax were thoroughly mixed, pressed into the shape of a rod under a pressure of about 100,000 pounds per square inch, and sintered in hydrogen at about 700° C. The rod was strong enough to stand moderately rough handling.

Example 4.—The following compositions were made into satisfactory welding rods by the method of Example 1: 55% zinc, 45% copper; and 83.3% copper, 9.8% tin, 4.9% phosphorus, 1.9% borax.

The rods may be formed in a hydraulic press, a percussion press, or by similar means, or may be extruded. It is frequently desirable to add to the powder a binder, for instance paraffin. Heat treatment may be effected in known ways, as by sintering in hydrogen. Heat treatment may be followed by mechanical working in some instances, to increase the strength and ductility of the rods.

The rods of the invention tend to fuse more readily under welding heat than do solid materials of similar composition. In many instances this is a distinct advantage.

The invention includes rods of any shape adapted for use in autogenous welding or soldering, and the word "rod" as used herein and in the appended claims is to be interpreted as meaning a body of any shape adapted to be fused by a welding or soldering heat and deposited upon a metal surface. Further, although specific compositions are described herein by way of example, the invention is not limited to or by these examples.

I claim:

1. Nonferrous welding rod consisting of a coherent aggregate containing at least 40% dendritic comminuted copper, the said copper dendrites being in compact interlocked condition serving to impart strong coherence to the rod.

2. Nonferrous welding rod consisting of a coherent aggregate containing a welding flux and at least 40% dendritic comminuted copper, the flux being distributed substantially uniformly throughout the rod the said copper dendrites being in compact interlocked condition serving to impart strong coherence to the rod.

3. Nonferrous welding rod consisting of a coherent aggregate containing a flux, a binder, and at least 40% dendritic comminuted copper, the flux and the binder being distributed substantially uniformly throughout the rod, the said copper dendrites being in compact interlocked condition serving to impart strong coherence to the rod.

4. Method of producing a composite welding rod having high physical strength and a composition not obtainable in the form of mechanically worked rods by fusion alloying procedure, which method comprises mixing together comminuted metals in desired proportions, a major portion of said comminuted metals consisting of dendritic copper particles capable of interlocking by deformation under pressure to form a rod characterized by high physical strength; forming the mixture into the shape of a welding rod by the application of pressure; sintering the rod so produced; and mechanically working the rod to increase its mechanical strength.

5. Method of producing a composite copper-base welding rod having high physical strength and a composition not obtainable in the form of mechanically worked rods by fusion alloying procedure, which method comprises mixing together in desired proportions comminuted metals and non-metallic flux, at least about 40% of said comminuted metals consisting of copper in the form of dendritic particles capable of interlocking by deformation under pressure to form a rod characterized by high physical strength; forming the mixture into the shape of a welding rod by application of pressure; sintering the rod so produced; and mechanically working the rod to increase its mechanical strength.

6. Method of producing a composite copper-base welding rod having high physical strength and a composition not obtainable in the form of mechanically worked rods by fusion alloying procedure, which method comprises mixing together in desired proportions comminuted metals, non-metallic flux, and a binder, at least about 40% of said comminuted metals consisting of copper in the form of dendritic particles capable of interlocking by deformation under pressure to form a rod characterized by high physical strength; forming the mixture into the shape of a welding rod by application of pressure; sintering the rod so produced; and mechanically working the rod to increase its mechanical strength.

7. A welding rod which consists of a coherent aggregate containing a flux and at least 40% copper, which rod is substantially identical with a rod of the same chemical analysis produced by pressing, sintering, and mechanically working into the shape of a rod a mixture of a flux and at least 40% dendritic comminuted copper.

8. A welding rod which consists of a coherent aggregate containing a flux, a binder, and at least 40% copper, which rod is substantially identical with a rod of the same chemical analysis produced by pressing, sintering, and mechanically working into the shape of a rod a mixture of a flux, a binder, and at least 40% dendritic comminuted copper.

CHARLES HARDY.